United States Patent
Inoue et al.

(10) Patent No.: US 8,776,924 B2
(45) Date of Patent: Jul. 15, 2014

(54) INTAKE SYSTEM FOR SADDLE-RIDE TYPE VEHICLE

(71) Applicant: Honda Motor Co., Ltd., Tokyo (JP)

(72) Inventors: Yusuke Inoue, Wako (JP); Yusaburo Tani, Wako (JP); Munehiro Toda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/785,995

(22) Filed: Mar. 5, 2013

(65) Prior Publication Data

US 2013/0240277 A1 Sep. 19, 2013

(30) Foreign Application Priority Data

Mar. 16, 2012 (JP) ................. 2012-059963

(51) Int. Cl.
*B60K 13/06* (2006.01)

(52) U.S. Cl.
USPC .......................................... 180/68.3

(58) Field of Classification Search
USPC ........................................ 180/68.3
See application file for complete search history.

(56) References Cited

U.S. PATENT DOCUMENTS

| | | | | |
|---|---|---|---|---|
| 6,422,201 B1 * | 7/2002 | Yamada et al. | ............ | 123/336 |
| 6,478,105 B2 * | 11/2002 | Okuma | ............ | 180/219 |
| 7,174,981 B2 * | 2/2007 | Sugitani et al. | ............ | 180/68.1 |
| 7,314,107 B2 * | 1/2008 | Nakagome et al. | ............ | 180/68.3 |
| 7,357,205 B2 * | 4/2008 | Nishizawa | ............ | 180/68.3 |
| 7,380,624 B2 * | 6/2008 | Momosaki | ............ | 180/68.3 |
| 7,806,212 B2 * | 10/2010 | Sudoh et al. | ............ | 180/68.3 |
| 7,942,226 B2 * | 5/2011 | Nishizawa et al. | ............ | 180/219 |
| 8,105,406 B2 * | 1/2012 | Nishizawa et al. | ............ | 55/385.3 |
| 8,146,693 B2 * | 4/2012 | Oohashi et al. | ............ | 180/68.3 |
| 8,181,729 B2 * | 5/2012 | Hiramatsu et al. | ............ | 180/68.3 |
| 8,418,791 B2 * | 4/2013 | Matsuda et al. | ............ | 180/68.3 |
| 8,567,542 B2 * | 10/2013 | Shiina et al. | ............ | 180/68.3 |
| 2009/0090090 A1 * | 4/2009 | Nishizawa et al. | ............ | 55/290 |
| 2009/0090576 A1 * | 4/2009 | Nishizawa et al. | ............ | 180/219 |
| 2009/0218152 A1 * | 9/2009 | Oohashi et al. | ............ | 180/68.3 |
| 2011/0155492 A1 * | 6/2011 | Matsuda et al. | ............ | 180/68.3 |
| 2011/0232982 A1 * | 9/2011 | Abe et al. | ............ | 180/68.3 |
| 2011/0232983 A1 * | 9/2011 | Abe et al. | ............ | 180/68.3 |
| 2013/0192912 A1 * | 8/2013 | Shimomura et al. | ............ | 180/68.3 |
| 2013/0240277 A1 * | 9/2013 | Inoue et al. | ............ | 180/68.3 |

FOREIGN PATENT DOCUMENTS

JP 5-172013 A 7/1993

\* cited by examiner

*Primary Examiner* — Jeffrey J Restifo
(74) *Attorney, Agent, or Firm* — Birch, Stewart, Kolasch & Birch, LLP (57) ABSTRACT

An intake system for a vehicle includes a connecting tube disposed to bypass one side of a rear shock absorber. The capacity of the intake chamber is increased to achieve an improvement in intake performance and to reduce the influence of a liquid intake-spitting component on intake air. The connecting tube is formed to include a tubular main tube portion and a funnel portion installed integrally and consecutively with the main tube portion. The funnel portion has a funnel-shape that broadens as it nears the air cleaner with an opening of the main tube portion on the upstream end. An intake chamber serving as part of a purified-air chamber formed between the funnel portion and the cleaner case is formed at least below the main tube portion. A drain member is provided with the lower portion of the funnel portion to communicate with the lowest portion of the intake chamber.

20 Claims, 7 Drawing Sheets

INTAKE SYSTEM FOR SADDLE-RIDE TYPE VEHICLE

CROSS-REFERENCE TO RELATED APPLICATIONS

The present application claims priority under 35 USC 119 to Japanese Patent Application No. 2012-059963 filed Mar. 16, 2012 the entire contents of that are hereby incorporated by reference.

BACKGROUND OF THE INVENTION

1. Field of the Invention

The present invention relates to a saddle-ride type vehicle having an engine body mounted between a front wheel and a rear wheel on a body frame. A rear shock absorber is installed between a swing arm and the body frame so as to extend vertically and between a pair of left and right frame members constituting part of the body frame and disposed behind the engine body with the swing arm pivotally supporting the rear wheel and being swingably supported by the body frame. A cleaner case for an air cleaner and intake air control means are connected via a connecting tube disposed to bypass the side of the rear shock absorber, the air cleaner being disposed behind the rear shock absorber with the intake air control means being adapted to control an amount of air supplied from the air cleaner to the engine body. In particular, the invention relates to an improvement in an intake system.

2. Description of Background Art

An intake system for a motorcycle is known as disclosed in Japanese Patent Laid-Open No. Hei 5-172013, wherein a carburetor and a cleaner case for an air cleaner case disposed behind a rear shock absorber are connected by a connecting tube bypassing the rear shock absorber.

In the intake system disclosed in Japanese Patent Laid-Open No. Hei 5-172013, the connecting tube is composed of a tubular connecting tube main body and a sub-chamber. The connecting tube main body bends so as to bypass the rear shock absorber. The sub-chamber is integrally formed with a cleaner case side end portion of the connecting tube main body so as to form an intake chamber together with the cleaner case. The intake chamber constitutes part of a purified-air chamber on the downstream side of a cleaner element of the air cleaner. The connecting tube is formed to have a transverse-sectional shape largely changed from the middle thereof. It is desired, however, to increase the capacity of the intake chamber in order to improve intake performance of an engine, thereby achieving an improved charging efficiency.

SUMMARY AND OBJECTS OF THE INVENTION

The present invention has been made in view of such circumstances and aims to provide an intake system for a saddle-ride type vehicle that is intended to increase the capacity of an intake chamber formed between a connecting tube and a cleaner case for improving intake performance and for reducing an influence of a liquid intake-spitting component on intake air.

To achieve the above object, an embodiment of the present invention provides an intake system for a saddle-ride type vehicle wherein an engine body disposed between a front wheel and a rear wheel is mounted on a body frame. A rear shock absorber is installed between a pair of left and right frame members disposed behind the engine body and constituting part of the body frame with the rear shock absorber extending vertically between the body frame and a swing arm that is swingably supported by the body frame and pivotally supports the rear wheel. A cleaner case for an air cleaner and intake air control means are connected via a connecting tube disposed to bypass one side of the rear shock absorber with the air cleaner being disposed behind the rear shock absorber. The intake air control means is operative to control an amount of air supplied from the air cleaner to the engine body. The connecting tube is formed to include a tubular main tube portion and a funnel portion with the tubular main tube portion being connected to the intake air control means at the downstream end thereof. The funnel portion is integrally connected with the main tube portion and is formed in such a funnel-shape that broadens as it nears the air cleaner from the outer circumference of an intermediate portion of the main tube portion. The funnel portion is connected to the cleaner case in such a manner that the opening of the main tube portion on the upstream end faces a cleaner element of the air cleaner and the funnel portion forms a purified-air chamber on the downstream side of the cleaner element together with the cleaner case. The funnel portion is formed to have such a shape that the intake chamber serving as part of the purified-air chamber is formed at least below the main tube portion. A drain means for discharging a liquid intake air spitting component collected in the intake chamber is connected consecutively to a lower portion of the funnel portion so as to communicate with a lowest portion of the intake chamber.

According to an embodiment of the present invention, the drain means includes a tubular first joint portion provided integrally with the funnel portion so as to project to the front and downwardly. A conduit is connected to the first joint portion at one end thereof with the conduit being held on the inner side of one of the pair of left and right frame members at a position below the first joint portion.

According to an embodiment of the present invention, the funnel portion is formed such that the intake chamber also extends above the main tube portion and a tubular second joint portion for introducing blow-by gas from the engine body is provided integrally with the upper portion of the funnel portion at an upper portion of the intake chamber.

According to an embodiment of the present invention, second drain means extending downwardly from the blow-by gas passage forming means is joined to a middle part of the blow-by gas passage forming means connecting the engine body with the second joint portion.

According to an embodiment of the present invention, a lowest portion of the drain means connected consecutively with a lower portion of the funnel portion and a lowest portion of the second drain means extending downwardly from the middle part of the blow-by gas passage forming means are located at positions close to each other around the engine body with the lowest portions being closed by removable caps.

According to an embodiment of the present invention, an intake air temperature sensor is attached on an upper portion of a front wall of the cleaner case so as to project into the unpurified-air chamber on the upstream side of the cleaner element.

In addition, the pivot plate 17 of the embodiment corresponds to the frame member of the present invention with the throttle body 47 corresponding to the intake air control means and the pipe 66 corresponding to the conduit of the invention.

According to an embodiment of the present invention, the connecting tube is formed to integrally include the tubular main tube portion with an opening on the upstream end facing the cleaner element of the air cleaner and a funnel portion that broadens as it nears the air cleaner from the outer circumference of the intermediate portion of the main tube portion. In addition, the funnel portion that forms the intake chamber serving as part of the purified-air chamber at least below the main tube portion is joined to the cleaner case. Further, the drain means for discharging a liquid intake air spitting component collected in the intake chamber is provided consecutively with the lower portion of the funnel portion. Therefore, the spitting of intake air from the main tube portion toward the purified-air chamber can be reduced along with the straightening effect of the main tube portion formed relatively long from the intake air control means to the vicinity of the cleaner element. The capacity of the intake chamber can be ensured by forming the intake chamber at least below the main tube portion. The influence of the intake air spitting component on intake air is reduced since the liquid intake air spitting component is allowed to be discharged from the lower portion of the intake chamber by the drain means. Thus, an improvement in intake performance can be achieved.

According to an embodiment of the present invention, the tubular first joint portion is provided integrally with the funnel portion so as to project to the front and downwardly. The conduit constituting the drain means together with the first joint portion is connected to the first joint portion. Further, the conduit is held on the inner side of one of the left and right frame members at a position below the first joint portion. Therefore, the liquid intake air spitting component from the lower portion in the intake chamber can be collected and stably retained in the drain means. In addition, the holding portion of the pipe is hardly visually recognized from the outside, so that the external appearance can be enhanced.

According to an embodiment of the present invention, the funnel portion is formed such that the intake chamber also extends above the main tube portion. In addition, the tubular second joint portion for introducing blow-by gas is attached integrally to an upper portion of the funnel portion. Therefore, a further increase in the capacity of the intake chamber can be achieved. In addition, while circulating blow-by gas into intake air, the oil entrained by the blow-by gas can be collected on the drain means side from the lower portion in the intake chamber. Thus, the influence of the oil entrained by the blow-by gas on intake air can be reduced, so that an improvement in engine performance can be achieved.

According to an embodiment of the present invention, the second drain means extending downwardly from the blow-by gas passage forming means is connected to the middle of the blow-by gas passage forming means. Therefore, the oil entrained by the blow-by gas can be prevented from being led toward the intake chamber. Thus, the influence of the oil entrained by blow-by gas on intake air can be reduced, so that a further improvement in engine performance can be achieved.

According to an embodiment of the present invention, the lowest portion of the drain means installed consecutively with the lower portion of the funnel portion and the lowest portion of the second drain means are closed by respective removable caps and are located at respective positions close to each other around the engine body. Therefore, the ease of maintenance can be enhanced.

According to an embodiment of the present invention, the intake air temperature sensor is attached to an upper portion of the front wall of the cleaner case so as to project into the unpurified-air chamber on the upstream side of the cleaner element. Therefore, although the intake air temperature sensor is disposed at a position close to the second joint portion, the influence of blow-by gas on the intake air temperature sensor can be suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings that are given by way of illustration only, and thus are not limitative of the present invention, and wherein.

DETAILED DESCRIPTION OF THE PREFERRED EMBODIMENTS

An embodiment of the present invention will hereinafter be described with reference to FIGS. 1 to 7. It is to be noted that front and back or rear, and left and right in the following description shall be directions an occupant riding on a motorcycle faces.

Figure 1:
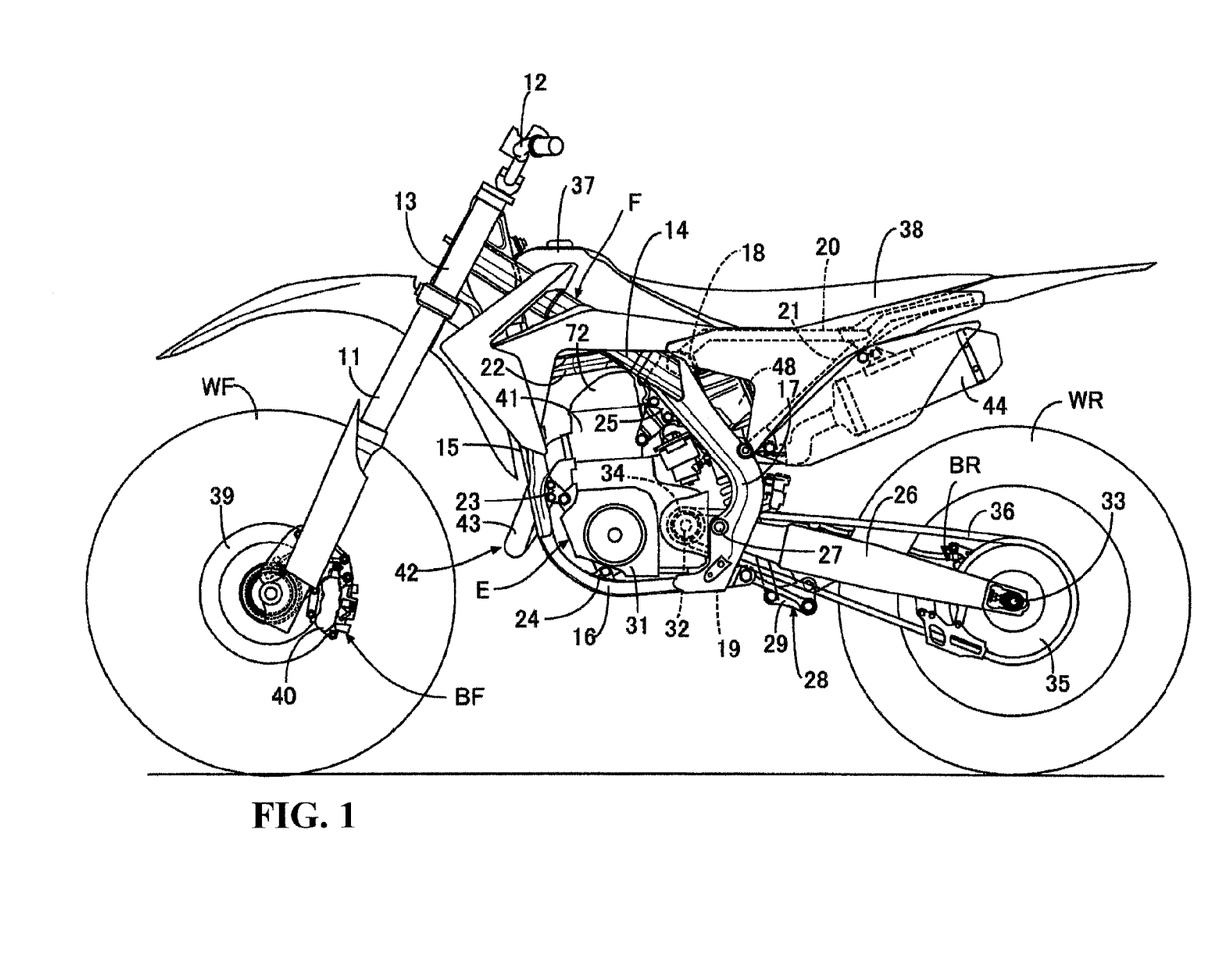
FIG. 1 is a left lateral view of a motorcycle.

Referring first to FIG. 1, a motorcycle is used for motocross races. A body frame F of the motorcycle includes a head pipe 13 that steerably supports a front fork 11 pivotally supporting a front wheel WF and a steering handlebar 12 with a pair of left and right main frames 14 extending rearwardly and downwardly from the head pipe 13. A down frame 15 extends rearwardly and downwardly from the head pipe at a steeper angle than the main frames 14. In addition, the body frame F includes a pair of left and right lower frames 16 joined to the lower end of the down frame 15 and extending rearwardly with a pair of left and right pivot plates 17 that has upper ends joined to corresponding rear ends of the main frames 14, extends downwardly with lower ends joined to corresponding rear ends of both the lower frames 16. An upper cross member 18 is installed between the upper ends of the pivot plates 17. Further, the body frame F includes a lower cross member 19 installed between the lower ends of both the pivot plates 17 with a pair of left and right seat rails 20 having front ends joined to the upper cross member 18 and extending rearwardly with a pair of left and right rear frames 21 connecting vertically intermediate portions of the pivot plates 17 with rear portions of the seat rails 20. A generally U-shaped reinforcing frame 22 connects the lower portion of the down frame 15 with both the main frames 14.

An engine body EB of a single cylinder engine E is disposed in a space surrounded by the main frames 14, the down frame 15, the lower frames 16 and the pivot plates 17. The engine body EB is supported at its front portion by the down frame 15 via a first engine hanger 23, at its lower portion by second engine hangers 24 attached to the lower frames 16, and at its upper portion by upper portions of the pivot plates 17 via third engine hangers 25.

Swing arms 26 extend in the longitudinal direction so as to sandwich the rear wheel WR from both sides. In addition, the swing arms 26 have front ends supported by the lower portions of the pivot plates 17 via a shaft 27 in a vertically swingable manner. An axle 33 of the rear wheel WR is pivotally supported by the rear ends of the swing arms 26.

A link mechanism 28 is installed between the lower cross member 19 of the body frame F and each of the swing arms 26. A rear shock absorber 30 is installed between a link member 29 constituting part of the link mechanism 28 and the upper cross member 18. In other words, the rear shock absorber 30 that is connected at its upper end to the upper cross member 18 of the body frame F is connected at its lower end to the swing arm 26 via the link member 29 of the link mechanism 28.

A transmission not shown is housed in a crankcase 31 constituting part of the engine body EB. The transmission has an output shaft 32 projecting to the left from the crankcase 31. An endless chain 36 is wound around a drive sprocket 34 attached to the output shaft 32 and around a driven sprocket 35 attached to the axle 33 of the rear wheel WR.

A fuel tank 37 is mounted on the main frames 14 at a position above the engine body EB. A riding seat 38 is disposed behind the fuel tank 37 so as to be supported by the seat rails 20.

The rotation of the front wheel WF can be braked by a front wheel disk brake BF. The front wheel disk brake BF has a front brake disk 39 disposed on the left of the front wheel WF so as to be rotated together with the front wheel WF and a front brake caliper 40 supported by the front fork 11 so as to straddle the outer circumference of the front brake disk 39. The rotation of the rear wheel WR can be braked by a rear wheel disk brake BR disposed on the right of the rear wheel WR.

An exhaust system 42 is connected to the cylinder head 41 constituting part of the engine body EB. The exhaust system 42 includes an exhaust pipe 43 connected to a front wall surface of the cylinder head 41 and a pair of left and right silencers 44 disposed on both sides of the rear wheel WR in the vehicle-width direction and connected to the exhaust pipe 43.

Figure 2:
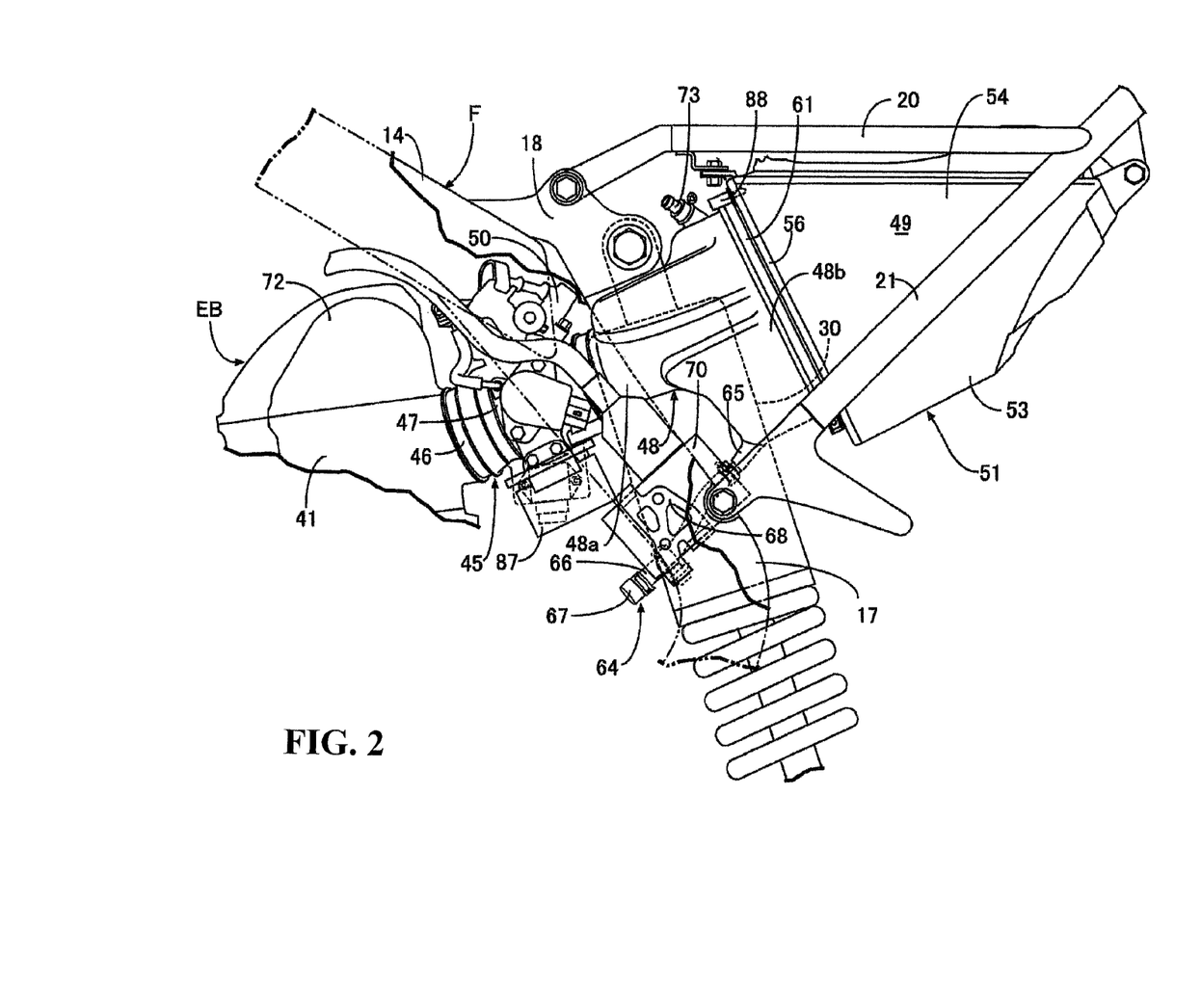
FIG. 2 is a left lateral view of the vicinity of an intake system as viewed from the same direction as in FIG. 1.
Figure 3:
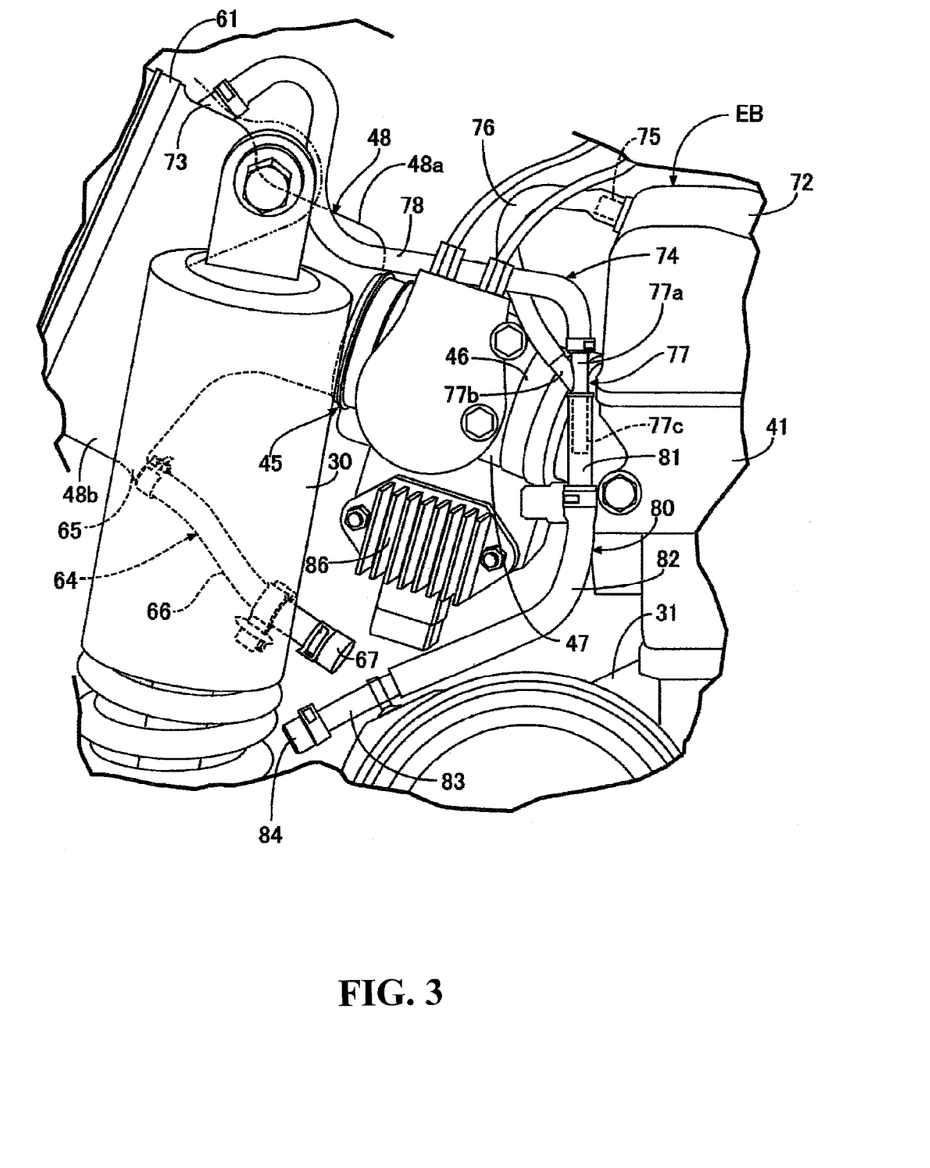
FIG. 3 is a perspective view of the vicinity of the intake system as viewed from the right, i.e., the opposite side of FIG. 2, and slightly above.

With additional reference to FIGS. 2 and 3, an intake system 45 connected to the cylinder head 41 includes an intake pipe 46 having a downstream end connected to a rear wall surface of the cylinder head 41; a throttle body 47 as intake air control means having a downstream end coupled to the other end (upstream end) of the intake pipe 46; a connecting tube 48 having a downstream end coupled to the upstream end of the throttle body 47 and an air cleaner 49 connected to the upstream end of the connecting tube 48.

The throttle body 47 is adapted to control a quantity of air supplied from the air cleaner 49 to the cylinder head 41 of the engine body EB. In addition, a fuel injection valve 50 is attached to the throttle body 47.

The rear shock absorber 30 extends vertically so as to be connected at the upper end thereof to the upper cross member 18 of the body frame F. The rear shock absorber 30 is disposed between the pivot plates 17, that is a pair of left and right frame members constituting part of the body frame F and disposed behind the engine body EB. The air cleaner 49 is disposed behind the rear shock absorber 30.

Figure 4:
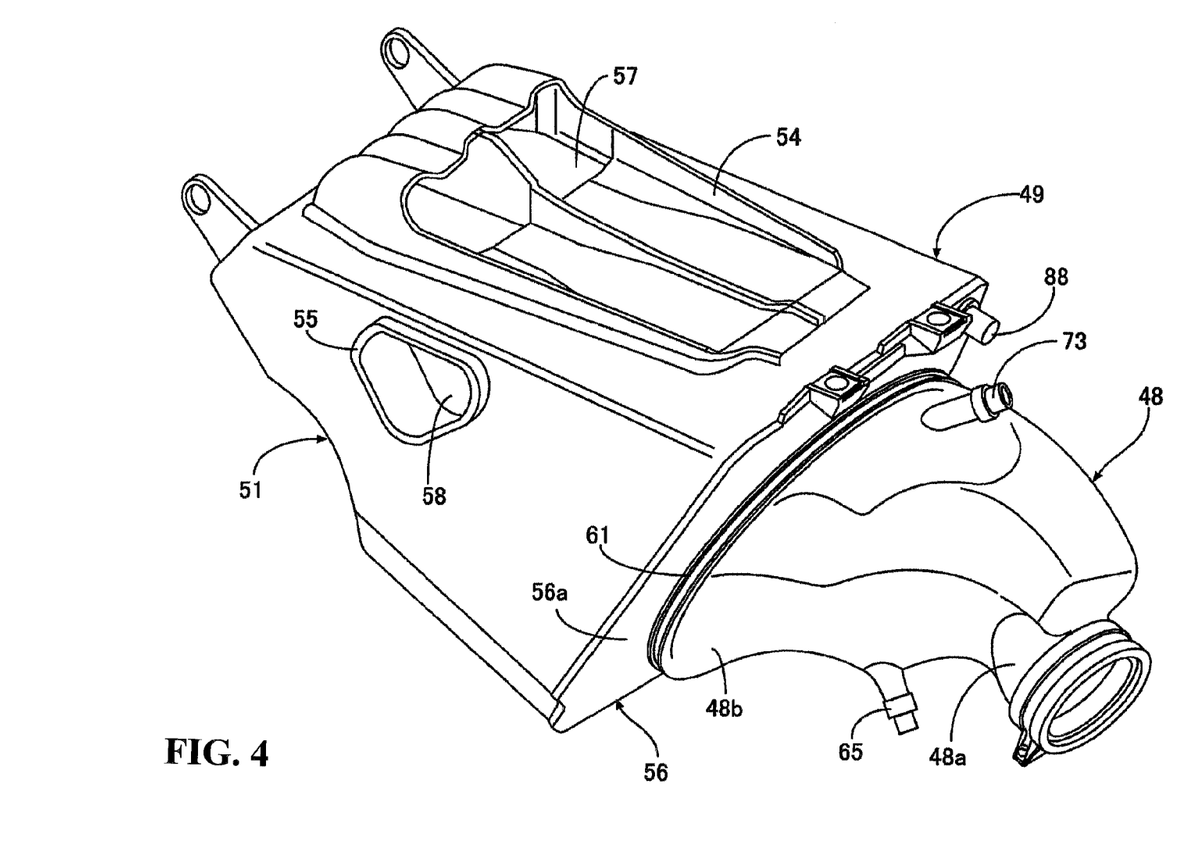
FIG. 4 is a perspective view of an air cleaner and a connecting tube.
Figure 5:
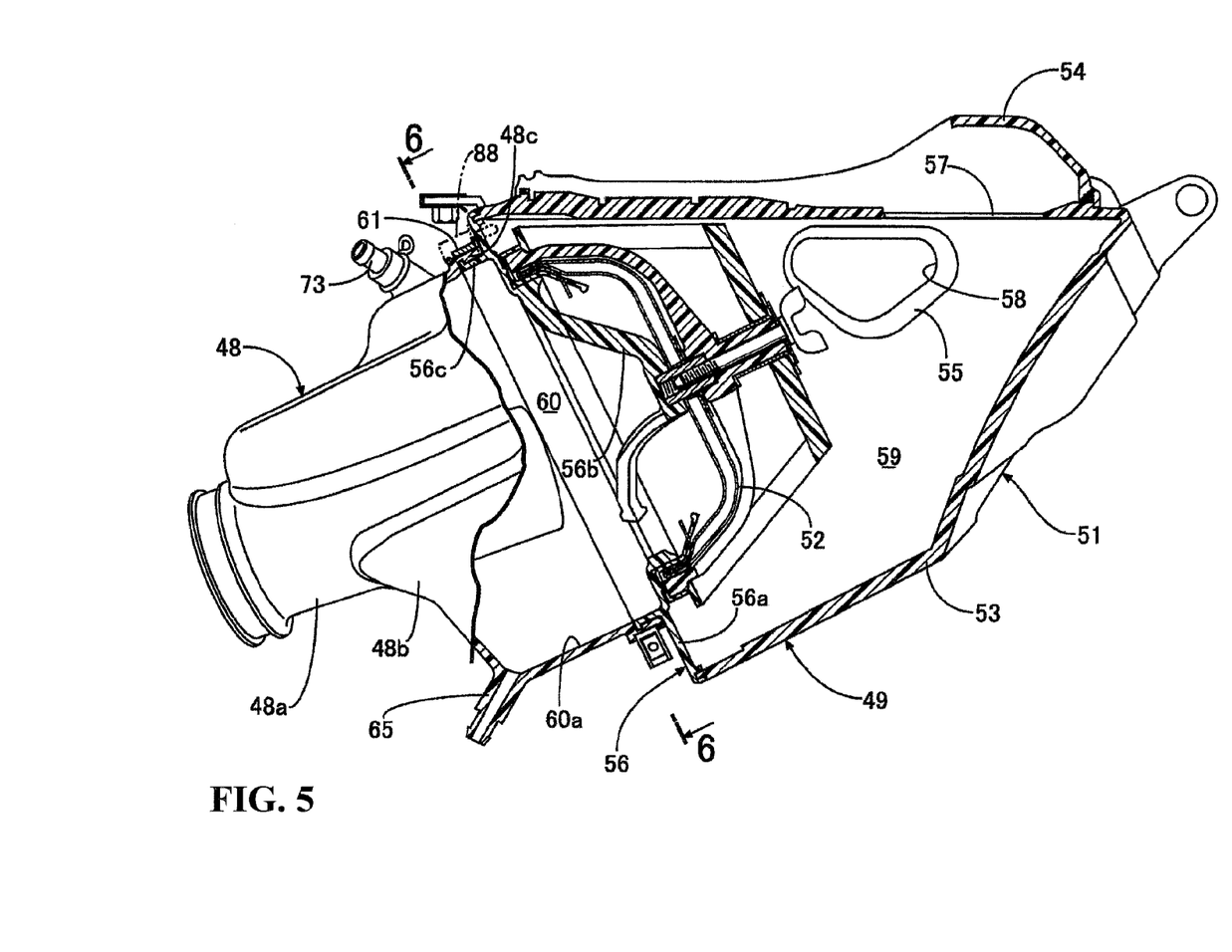
FIG. 5 is a partial-cutout left lateral view of the air cleaner and the connecting tube as viewed from the same direction as in FIG. 2.

With reference to FIGS. 4 and 5, the air cleaner 49 is configured to include a cleaner element 52 in a cleaner case 51. The air cleaner case 51 includes a case body 53, an upper cover 54, an air introduction tubular member 55 and an element support member 56. The case body 53 is opened at its front end and formed to be gradually broadened in vertical width as it goes forward. The upper cover 54 is attached to the upper surface of an upper wall 53a of the case body 53 so as to cover a portion of a first air introduction port 57 provided in the upper wall 53a. The air introduction tubular member 55 is attached to a right sidewall 53b of the case body 53 so as to form a secondary air introduction port 58. The element support member 56 is attached to a front end portion of the case body 53. The cleaner case 51 is supported by the seat rails 20 of the body frame F.

The element support member 56 integrally includes an end wall portion 56a, element support frame portions 56b and a connection tubular portion 56c. The end wall portion 56a is formed like a flat plate so as to close the outer circumferential portion of the front end opening portion of the case body 53. The element support frame portions 56b are consecutively provided at a plurality of positions on the inner circumference of the end wall portion 56a. The connection tubular portion 56c projects forward from the front end intermediate portion of the end wall portion 56a. The cleaner element 52 is fastened to the central portion of the element support frame portion 56b. In this way, an unpurified-air chamber 59 on the upstream side of the cleaner element 52 is formed to continue into the first and second air introduction ports 57 and 58.

Figure 6:
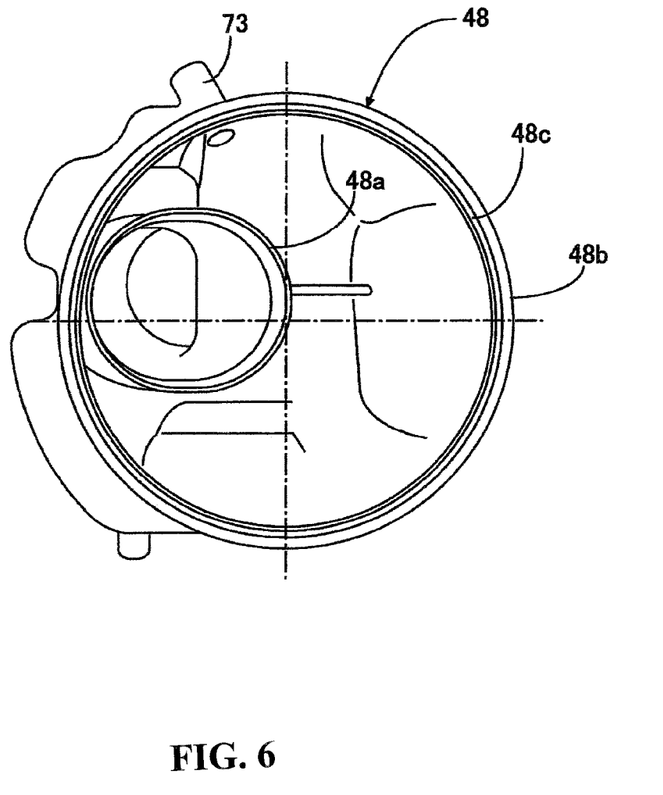
FIG. 6 is a view of the connecting tube as viewed from the arrow-direction of line 6-6 in FIG. 5.

With additional reference to FIG. 6, the connecting tube 48 is disposed to bypass the left side of the rear shock absorber 30. In addition, the connecting tube 48 integrally has a tubular main tube portion 48a having a downstream end connected to the throttle body 47 and a funnel portion 48b provided integrally and consecutively with the main tube portion 48a. The connecting tube 48 may be made of rubber. The main tube portion 48a is curvedly formed so as to bypass the rear shock absorber 30 with its transverse area being roughly constant over the overall axial length thereof. The funnel portion 48b is formed like a funnel that is gradually broadened as it goes from the outer circumference of the intermediate portion of the main tube portion 48a toward the air cleaner 49.

A fitting tubular portion 48c is integrally provided at an end portion of the funnel portion 48b on the cleaner case 51 side. The fitting tubular portion 48c is adapted to receive the connection tubular portion 56c, fitted thereto, of the element support member 56 of the cleaner case 51. A band 61 wound around the outer circumference of the fitting tubular portion 48c to that the connection tubular portion 56c is fitted is tightened to connect the funnel portion 48b of the connecting tube 48 to the cleaner case 51.

In the state where the funnel portion 48b of the connecting tube 48 is connected to the cleaner case 51, the upstream end of the main tube portion 48a has its opening faced to the cleaner element 52 of the air cleaner 49. The funnel portion 48b and the air cleaner case 51 cooperatively form a purified-air chamber 60 on the downstream side of the cleaner element 52.

In addition, the funnel portion 48b is formed to have such a shape wherein an intake chamber 60a serving as part of the purified-air chamber 60 is formed at least below the main tube portion 48a. First drain means 64 for discharging a liquid intake air spitting component collected in the intake chamber 60a is provided consecutively with a lower portion of the funnel portion 48b so as to communicate with the lowest portion of the intake chamber 60a.

Figure 7:
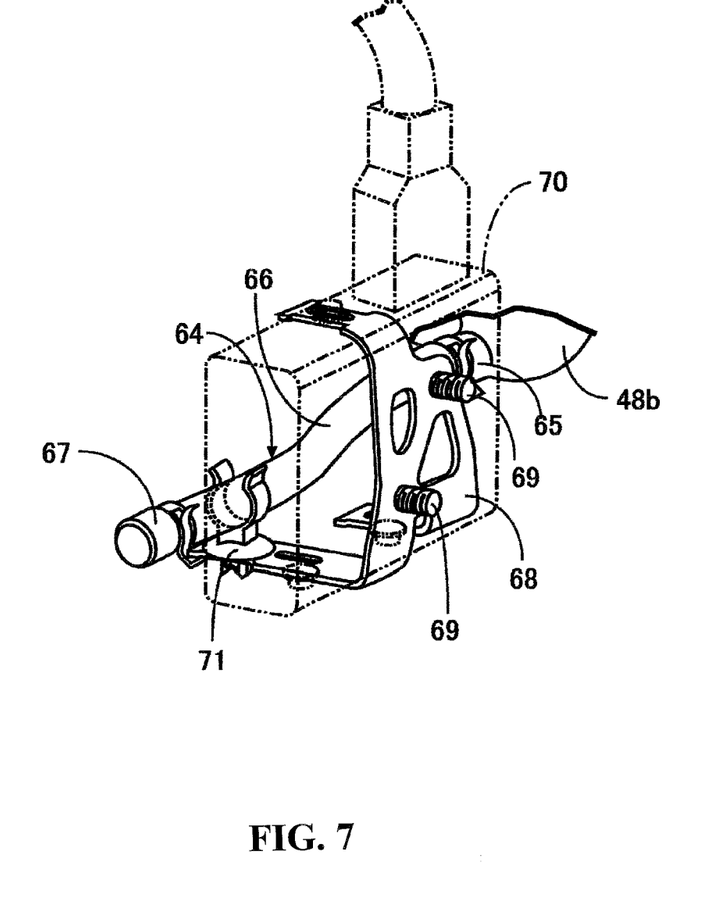
FIG. 7 is a perspective view showing a state where first drain means is held by an ECU attachment stay.

With additional reference to FIG. 7, the first drain means 64 includes a first tubular joint portion 65 and a pipe 66 that is a conduit. The first joint portion 65 is provided integrally with the funnel portion 48b so as to project forward and downwardly. The pipe 66 is connected at its one end to the first joint portion 65 by being held so as to be located below the first joint portion 65 at a position inside the left pivot plate 17 of the pair of left and right pivot plates 17.

The pipe 66 is desirably formed of a synthetic resin so as to have translucency so that its inside can be seen therethrough. The leading end of the pipe 66, i.e., the lower end of the first drain means 64 is closed by a removable cap 67.

An ECU stay 68 supporting the ECU 70 is attached to the inside of the left pivot plate 17 by using, e.g., two bolts 69, 69. The pipe 66 is held by a holder 71 attached to the ECU stay 68.

In addition, the funnel portion 48b of the connecting tube 48 is formed such that the intake chamber 60a broadens also above the main tube portion 48a. A second tubular joint portion 73 is provided integrally with the upper portion of the funnel portion 48b at the upper portion of the intake chamber 60a. The second joint portion 73 is adapted to introduce blow-by gas from the engine body EB.

As clearly shown in FIG. 3, blow-by gas passage forming means 74 is installed between the head cover 72 of the engine body EB and the second joint portion 73. The blow-by gas passage forming means 74 is adapted to lead the blow-by gas led out from the inside of the head cover 72 toward the second joint portion 73. The blow-by gas passage forming means 74 includes a hose 76, a branch pipe 77 and a hose 78. The hose 76 is connected at its upstream end to a third joint portion 75 formed tubular and installed on the head cover 72. The branch pipe 77 is coupled to the downstream end of the hose 76. The hose 78 connects the branch pipe 77 with the second joint portion 73.

A second drain means 80 extending downwardly from the blow-by gas passage forming means 74 is connected to the middle of the blow-by gas passage forming means 74.

The branch pipe 77 has first and second branch pipe portions 77a and 77b disposed in a Y-shape so as to be connected to the hoses 78 and 76, respectively, and a third branch pipe portion 77c extending downwardly from a consecutive portion of the branch pipe portions 77a, 77b. The second drain means 80 includes a pipe 81 made of a synthetic resin, a hose 82 and a pipe 83 made of a synthetic resin. The pipe 81 has an upper end portion coupled to the third branch pipe portion 77c. The hose 82 has an upper end coupled to the lower end of the pipe 81. The pipe 83 has a lower end coupled to the hose 82. The pipe 83 desirably has translucency so that its inside can be seen therethrough. The leading end of the pipe 83, i.e., the lower end of the second drain means 80 is closed by a removable cap 84.

In addition, the second drain means 80 is supported by the upper portion of the crankcase 31 and the cylinder head 41 in the engine body EB. The lowest portion of the first drain means 64 is installed consecutively with the lower portion of the funnel portion 48b with the lowest portion of the second drain means 80 extending downwardly from the middle of the blow-by gas passage forming means 74 are closed by removable caps 67 and 84, respectively, and are located at respective positions close to each other around the engine body EB.

A CDI unit 86 (see FIG. 3) facing the vehicle-widthwise right and an ignition coil 87 (see FIG. 2) facing the vehicle-widthwise left are mounted on the lower portion of the throttle body 47.

An intake air temperature sensor 88 is attached to the upper portion of the front wall of the cleaner case 51, i.e., to the upper portion of the end wall portion 56a of the element support member 56 so as to enter the inside of the unpurified-air chamber 59 on the upstream side of the cleaner element 52.

A description is next given of the operation of the present embodiment. The connecting tube 48 is formed to include the tubular main tube portion 48a having the downstream end connected to the throttle body 47 and the funnel portion 48b provided integrally and consecutively with the main portion 48a so as to be formed in such a funnel-shape as to broaden as it goes toward the air cleaner 49 from the outer circumference of the intermediate portion of the main tube portion 48a. The funnel portion 48b is connected to the cleaner case 51 in such a manner that while the upstream end of the main tube portion 48a opens so as to face the cleaner element 52 of the air cleaner 49, the purified-air chamber 60 on the downstream side of the cleaner element 52 is formed in cooperation with the cleaner case 51. The funnel portion 48b is formed to have such a shape that the intake chamber 60a serving as part of the purified-air chamber 60 is formed at least below the main tube portion 48a. The first drain means 64 for discharging a liquid intake air spitting component collecting in the intake chamber 60a is provided consecutively with the lower portion of the funnel portion 48b so as to communicate with the lowest portion of the intake chamber 60a. Therefore, the spitting of intake air from the main tube portion 48a toward the purified-air chamber 60 can be reduced along with the straightening effect of the main tube portion 48a formed relatively lengthwise from the throttle body 47 to the vicinity of the cleaner element 52. The capacity of the intake chamber 60a can be ensured in such a manner that the intake chamber 60a is formed at least below the main tube portion 48a. The influence of the intake air spitting component on intake air is reduced in such a manner that the liquid intake air spitting component is allowed to be discharged from the lower portion of the intake chamber 60a by the first drain means 64. Thus, an improvement in intake performance can be achieved.

The first drain means 64 includes the first joint portion 65 formed tubular and provided integrally with the funnel portion 48b so as to project forward and downward and the pipe 66 connected at its one end to the first joint portion 65 by being held so as to be located below the first joint portion 65 at a position inside one of the pair of left and right pivot plates 17. Therefore, the liquid intake air spitting component from the lower portion in the intake chamber 60a can be collected and stably held in the first drain means 64. In addition, it is hard for the holding portion of the pipe 66 to be visually recognized from the outside, so that external appearance can be enhanced.

The funnel portion 48b of the connecting tube 48 is formed such that the intake chamber 60a broadens also above the main tube portion 48a. The second joint portion 73 formed tubular to introduce blow-by gas from the engine body EB is installed integrally with the upper portion of the funnel portion 48b at the upper portion of the intake chamber 60a. Therefore, a further increase in the capacity of the intake chamber 60a can be achieved. In addition, while circulating blow-by gas into intake air, the oil entrained by blow-by gas can be collected on the first drain means 64 side from the lower portion in the intake chamber 60a. Thus, the influence of the oil entrained by blow-by gas on intake air can be reduced. Thus, an improvement in engine performance can be achieved.

The second drain means 80 is joined to the middle of the blow-by gas passage forming means 74 connecting the engine body EB with the second joint portion 73, and it extends downwardly from the blow-by gas passage forming means 74. This prevents oil entrained by blow-by gas from being led into the intake chamber 60a. Thus, the influence of the oil entrained by blow-by gas on intake air can be reduced, so that a further improvement in engine performance can be achieved.

The lowest portion of the first drain means 64 connected consecutively to the lower portion of the funnel portion 48*b*, and the lowest portion of the second drain means 80 extending downward from the middle of the blow-by gas passage forming means 74 are located at positions close to each other around the engine body EB, and they are closed with removable caps 67 and 84, respectively. Thus, the ease of maintenance can be enhanced.

Further, the intake air temperature sensor 88 is attached on the upper portion of the front wall of the cleaner case 51 so as to project into the unpurified-air chamber 59 on the upstream side of the cleaner element 52. Therefore, although the intake air temperature sensor 88 is disposed at a position close to the second joint portion 73, the influence of blow-by gas on the intake air temperature sensor 88 can be suppressed.

One embodiment of the present invention has been described thus far. The present invention is not limited to the embodiment described above and can be modified in design in various ways without departing from the invention descried in the claims.

For example, the intake air control means in the embodiment described above is the throttle body 47. However, the present invention can be applied to an intake system employing a carburetor as the intake air control means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake system for a saddle-ride vehicle wherein an engine body disposed between a front wheel and a rear wheel is mounted on a body frame, comprising:
   a rear shock absorber installed between a pair of left and right frame members disposed behind the engine body and constituting part of the body frame, the rear shock absorber extending vertically between the body frame and a swing arm that is swingably supported by the body frame and pivotally supports the rear wheel; and
   a cleaner case for an air cleaner and intake air control means are connected via a connecting tube disposed to bypass one side of the rear shock absorber, the air cleaner being disposed behind the rear shock absorber, the intake air control means being operative to control an amount of air supplied from the air cleaner to the engine body;
   wherein the connecting tube is formed to include a tubular main tube portion and a funnel portion, the tubular main tube portion being connected to the intake air control means at the downstream end thereof, the funnel portion being integrally connected with the main tube portion and formed in such a funnel-shape that broadens as it nears the air cleaner from the outer circumference of an intermediate portion of the main tube portion;
   the funnel portion is connected to the cleaner case wherein the opening of the main tube portion on the upstream end faces a cleaner element of the air cleaner and the funnel portion forms a purified-air chamber on the downstream side of the cleaner element together with the cleaner case;
   the funnel portion is formed wherein the intake chamber serving as part of the purified-air chamber is formed at least below the main tube portion; and
   drain means for discharging a liquid intake air spitting component collected in the intake chamber is connected consecutively to a lower portion of the funnel portion for communicating with a lowest portion of the intake chamber.

2. The intake system for a saddle-ride vehicle according to claim 1, wherein the drain means includes a tubular first joint portion provided integrally with the funnel portion so as to project in a front direction and downwardly, and a conduit connected to the first joint portion at one end thereof, the conduit being held on the inner side of one of the pair of left and right frame members at a position below the first joint portion.

3. The intake system for a saddle-ride vehicle according to claim 2, wherein the funnel portion is formed such that the intake chamber also extends above the main tube portion and a tubular second joint portion for introducing blow-by gas from the engine body is provided integrally with the upper portion of the funnel portion at an upper portion of the intake chamber.

4. The intake system for a saddle-ride vehicle according to claim 3, wherein an intake air temperature sensor is attached on an upper portion of a front wall of the cleaner case to project into the unpurified-air chamber on the upstream side of the cleaner element.

5. The intake system for a saddle-ride vehicle according to claim 3, wherein second drain means extending downwardly from the blow-by gas passage forming means is joined to a middle part of the blow-by gas passage forming means connecting the engine body with the second joint portion.

6. The intake system for a saddle-ride vehicle according to claim 5, wherein an intake air temperature sensor is attached on an upper portion of a front wall of the cleaner case to project into the unpurified-air chamber on the upstream side of the cleaner element.

7. The intake system for a saddle-ride vehicle according to claim 5, wherein the blow-by gas passage directs blow-by gas from the inside of a head cover towards the tubular second joint portion.

8. The intake system for a saddle-ride vehicle according to claim 7, wherein the blow-by gas passage includes a first hose operatively connected to a third joint portion connected to the head cover, a branch pipe coupled to a downstream end of the first hose and a second hose for operatively connecting the branch pipe with the second joint portion.

9. The intake system for a saddle-ride vehicle according to claim 5, wherein a lowest portion of the drain means connected consecutively with a lower portion of the funnel portion and a lowest portion of the second drain means extending downwardly from the middle part of the blow-by gas passage forming means are located at positions close to each other around the engine body, and the lowest portions are closed by removable caps, respectively.

10. The intake system for a saddle-ride vehicle according to claim 9, wherein an intake air temperature sensor is attached on an upper portion of a front wall of the cleaner case to project into the unpurified-air chamber on the upstream side of the cleaner element.

11. An intake system for a saddle-ride vehicle, comprising:
   a left and right frame member;
   an engine body mounted on the left and right frame members;
   a rear shock absorber installed operatively connected to the left and right frame members and being disposed behind the engine body, the rear shock absorber extending vertically between the left and right frame members;

a swing arm swingably supported relative to the left and right frame members;

a cleaner case for an air cleaner and intake air control means being connected via a connecting tube disposed to bypass one side of the rear shock absorber, the air cleaner being disposed behind the rear shock absorber, the intake air control means being operative to control an amount of air supplied from the air cleaner to the engine body;

wherein the connecting tube is formed to include a tubular main tube portion and a funnel portion, the tubular main tube portion being connected to the intake air control means at the downstream end thereof, the funnel portion being integrally connected with the main tube portion and formed in such a funnel-shape that broadens as it nears the air cleaner from the outer circumference of an intermediate portion of the main tube portion;

said funnel portion being connected to the cleaner case wherein the opening of the main tube portion on the upstream end faces a cleaner element of the air cleaner and the funnel portion forms a purified-air chamber on the downstream side of the cleaner element together with the cleaner case;

said funnel portion being formed wherein the intake chamber serving as part of the purified-air chamber is formed at least below the main tube portion; and drain means for discharging a liquid intake air spitting component collected in the intake chamber is connected consecutively to a lower portion of the funnel portion for communicating with a lowest portion of the intake chamber.

12. The intake system for a saddle-ride vehicle according to claim 11, wherein the drain means includes a tubular first joint portion provided integrally with the funnel portion so as to project in a front direction and downwardly, and a conduit connected to the first joint portion at one end thereof, the conduit being held on the inner side of one of the pair of left and right frame members at a position below the first joint portion.

13. The intake system for a saddle-ride vehicle according to claim 12, wherein the funnel portion is formed such that the intake chamber also extends above the main tube portion and a tubular second joint portion for introducing blow-by gas from the engine body is provided integrally with the upper portion of the funnel portion at an upper portion of the intake chamber.

14. The intake system for a saddle-ride vehicle according to claim 13, wherein an intake air temperature sensor is attached on an upper portion of a front wall of the cleaner case to project into the unpurified-air chamber on the upstream side of the cleaner element.

15. The intake system for a saddle-ride vehicle according to claim 13, wherein second drain means extending downwardly from the blow-by gas passage forming means is joined to a middle part of the blow-by gas passage forming means connecting the engine body with the second joint portion.

16. The intake system for a saddle-ride vehicle according to claim 15, wherein an intake air temperature sensor is attached on an upper portion of a front wall of the cleaner case to project into the unpurified-air chamber on the upstream side of the cleaner element.

17. The intake system for a saddle-ride vehicle according to claim 15, wherein the blow-by gas passage directs blow-by gas from the inside of a head cover towards the tubular second joint portion.

18. The intake system for a saddle-ride vehicle according to claim 17, wherein the blow-by gas passage includes a first hose operatively connected to a third joint portion connected to the head cover, a branch pipe coupled to a downstream end of the first hose and a second hose for operatively connecting the branch pipe with the second joint portion.

19. The intake system for a saddle-ride vehicle according to claim 15, wherein a lowest portion of the drain means connected consecutively with a lower portion of the funnel portion and a lowest portion of the second drain means extending downwardly from the middle part of the blow-by gas passage forming means are located at positions close to each other around the engine body, and the lowest portions are closed by removable caps, respectively.

20. The intake system for a saddle-ride vehicle according to claim 19, wherein an intake air temperature sensor is attached on an upper portion of a front wall of the cleaner case to project into the unpurified-air chamber on the upstream side of the cleaner element.

* * * * *